UNITED STATES PATENT OFFICE.

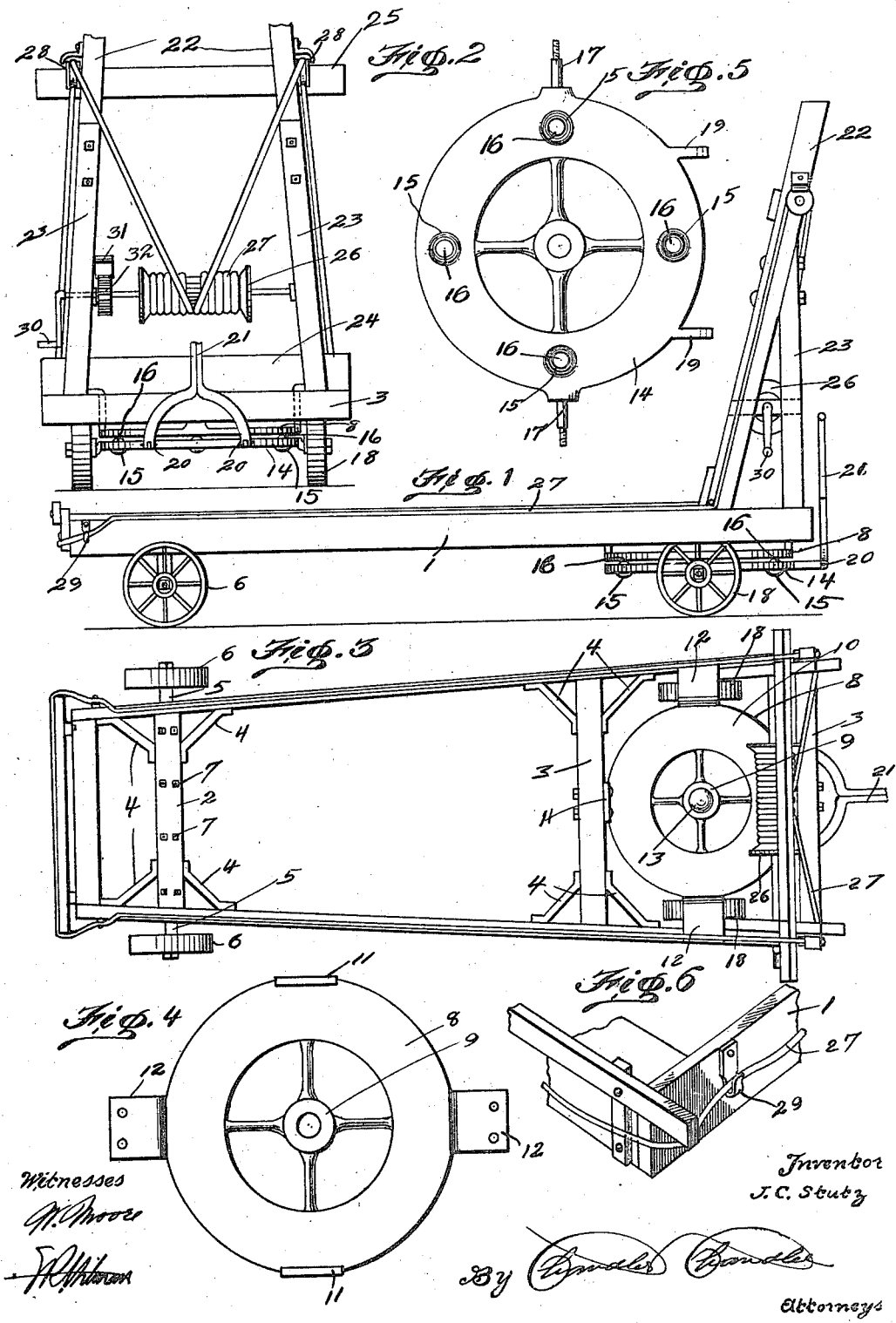
J. C. STUTZ.
TRUCK.
APPLICATION FILED OCT. 29, 1917.
1,268,178. Patented June 4, 1918.

JOHN C. STUTZ, OF McCLEARY, WASHINGTON.

TRUCK.

1,268,178.

Specification of Letters Patent.

Patented June 4, 1918.

Application filed October 29, 1917. Serial No. 199,129.

*To all whom it may concern:*

Be it known that I, JOHN C. STUTZ, a citizen of the United States, residing at McCleary, in the county of Grays Harbor, State of Washington, have invented certain new and useful Improvements in Trucks; and I do hereby declare the following to be a full, clear, and exact description of the invention, such as will enable others skilled in the art to which it appertains to make and use the same.

This invention relates to trucks.

The object of the invention is to provide a truck for use in planing mills and similar factories, for the practical transportation of such milled articles as doors, so that when they are transferred from the finishing machines to the warehouse or other point of deposit they may be handled without the usual damage occasioned by the stacking of doors in flat stacks on trucks.

In particular it is the object of this invention to provide a truck which is particularly adapted for use in connection with a door stacking machine which forms the subject matter of a separate application for patent, and is therefore not disclosed or described in this case.

With the above objects in view, and such others relating to the details of construction, as may hereinafter appear, my invention will now be fully set forth and described, reference being had to the accompanying drawings.

In the drawings:—

Figure 1 is a side elevation,

Fig. 2 is an end view,

Fig. 3 is a plan view with the bottom boards removed,

Fig. 4 is a view of one member of a truck bearing,

Fig. 5 is a view of a companion member thereof, and

Fig. 6 is an enlarged detail view in perspective of a corner of the truck.

Referring more particularly to the drawings, 1 represents the side rails or sills of the truck which are connected by a rear bolster 2 and the front bolsters 3. Each of the bolsters 2 and 3 is suitably braced to the sills 1 by means of corner brackets 4.

Mounted below the bolster 2 is the rear axle 5 carrying the wheels 6, U-bolts 7, which inclose the axle and extend through the bolster so that their free ends may be engaged by nuts upon the top of the latter, hold the axle 5 in place.

Mounted between the front bolsters 3 and the sills, is a truck plate 8 which has the king bolt bearing 9 and the annular track surface 10. The truck plate 8 is secured to suspend the track surface 10 on a level below the bottoms of the sills 1, the vertical ears 11 being bolted to the faces of the bolsters 3 and the L-shaped supports 12 having their horizontal arms rested upon the tops of the sills 1. Connected to the truck plate 8 by means of a king pin 13 is a pivot wheel or truck plate 14 which has an annular track surface which corresponds to the track surface 10, and a plurality of ball sockets 15 within which balls 16 are seated so as to directly support the surface 10.

Extending from the sides of the truck plate 14 are the wheel spindles 17 upon which the front wheels 18 are mounted. It is preferable that the wheels 6 and 18 be mounted upon roller bearings, so as to reduce the friction to a minimum. Also extending from the truck plate, in a forward direction and parallel to one another, is a pair of lugs 19 to which the forks 20 of a handle 21 are pivoted.

At the forward end of the truck, the sills support the standards 22 in a slightly forwardly inclined relation, in which position they are held by means of the braces 23. The lower ends of the standards 22 are connected by a cross bar 24 and near their upper ends are joined by a second cross bar 25. Journaled in bearing brackets extending across the standards 22 and the braces 23 is a drum 26 upon which the ends of a cable 27 are wound, the cable being then passed over pulleys 28 bracketed on the sides of the standards 22 toward their upper ends, and then having the bight of the cable extending alongside of the sills 1, and over the ends of the latter to be rested upon hooks 29 carried by the rear ends of the sills. The cable is thus disposed when the truck is to be loaded, so as to be entirely out of the way. When the truck has been loaded, the cable 27 is lifted from the hooks 29 around the body of the load, the cable passing freely from one pulley 28, around the doors stacked on the truck, and thence to the other pulley 28. After this, the drum 26 is wound by means of the crank handle 30 until the rope has been drawn taut, after which the pawl 31 is dropped to lock the ratchet wheel 32 so as to prevent the slacking of the rope.

The truck which has been described is admirably adapted for use in connection with my improved door stacking mechanism, described in my copending case, in that it is capable of being run beneath the framework of the stacking machine, and to have the doors stacked on and upon the floor of the truck and leaned against the standards 22, the truck being moved forward step by step as the doors are placed thereon. Aside from its particular use above defined, the truck also provides a very satisfactory and useful truck for all factory or mill work.

What I claim as my invention is:—

1. A truck, comprising in combination, a truck body, supporting wheels therefor, standards rising from the forward end of the truck, a drum mounted on said standards transversely of said truck, and a cable having its ends secured to the drum and having its bight passed rearwardly around the edges of the truck in position to be lifted around a load on the truck and tightened by means of said drum.

2. The combination with a load support, of a framework rising from the end of the load support, a winding means on the framework, a cable having its ends attached to the winding means and its bight extended around the sides of the load support to be lifted into engagement around a load on the support, and means to carry the cable in its slack position below the top surface of the support.

3. The combination with a load support, of a winding means mounted at one end of the load support above its top surface, a cable having its ends attached to the winding means and its bight extended around the sides of the load support to be lifted around a load on the support and means to hold the bight of the cable below the top surface of the support when the cable is slacked.

In testimony whereof, I affix my signature, in the presence of two witnesses.

JOHN C. STUTZ.

Witnesses:
F. G. CHAPMAN,
H. R. EDISON.

Copies of this patent may be obtained for five cents each, by addressing the "Commissioner of Patents, Washington, D. C."